US008567808B2

(12) United States Patent
Tholkes et al.

(10) Patent No.: US 8,567,808 B2
(45) Date of Patent: Oct. 29, 2013

(54) MODULAR STANDING FRAME

(75) Inventors: Alan L. Tholkes, Burnsville, MN (US); Wesley Ovre, Redwood Falls, MN (US); Gabriel Routh, Redwood Falls, MN (US); Jeffrey Schmidt, Redwoods Falls, MN (US); Michael Lokken, Grove City, MN (US); Duffy Trotter, Franklin, MN (US); Tamera Trotter, legal representative, Franklin, MN (US)

(73) Assignee: Altimate Medical, Inc., Morton, MN (US)

( * ) Notice: Subject to any disclaimer, the term of this patent is extended or adjusted under 35 U.S.C. 154(b) by 438 days.

(21) Appl. No.: 12/565,860

(22) Filed: Sep. 24, 2009

(65) Prior Publication Data

US 2010/0013276 A1 Jan. 21, 2010

Related U.S. Application Data

(62) Division of application No. 11/247,961, filed on Oct. 11, 2005, now Pat. No. 7,614,639.

(60) Provisional application No. 60/618,055, filed on Oct. 12, 2004.

(51) Int. Cl.

| | |
|---|---|
| ***B62B 1/00*** | (2006.01) |
| ***B62B 9/22*** | (2006.01) |
| ***B62B 7/00*** | (2006.01) |

(52) U.S. Cl.
USPC ........................ 280/638; 280/47.4; 280/47.41

(58) Field of Classification Search
USPC ..................... 280/638, 642, 643, 47.4, 47.41; 297/340, 353, DIG. 10, 135, 172, 297/423.11
See application file for complete search history.

(56) References Cited

U.S. PATENT DOCUMENTS

| | | | |
|---|---|---|---|
| 481,040 | A | 8/1892 | Longanecker |
| 1,731,375 | A | 10/1929 | Engers |
| 2,375,151 | A | 5/1945 | Troxell |
| 1,858,103 | A | 5/1952 | Menon |
| 3,023,048 | A | 2/1962 | Barton |

(Continued)

FOREIGN PATENT DOCUMENTS

| | | |
|---|---|---|
| EP | 1859765 | 11/2007 |
| JP | 2005237516 | 9/2005 |
| WO | 92/14432 | 9/1992 |
| WO | 00/28930 | 5/2000 |

OTHER PUBLICATIONS

Response from U.S. Appl. No. 12/169,492 dated Dec. 1, 2010.
Office action from U.S. Appl. No. 12/169,492 dated Mar. 4, 2011.

(Continued)

*Primary Examiner* — J. Allen Shriver, II
*Assistant Examiner* — James M Dolak
(74) *Attorney, Agent, or Firm* — Calfee Halter & Griswold, LLP

(57) ABSTRACT

A modular standing frame is described herein. The modular standing frame has a chair module adapted to raise and lower a user between sitting and standing postures without inducing shear between the user and the seat and seat back of the chair module. The chair module may be selectively coupled to one of a glider module adapted to provide walking-type exercise to a standing user, a workstation module that provides a work surface for a sitting or standing user, and a mobility module that allows the standing frame to be moved about by a user much like a wheel chair.

9 Claims, 12 Drawing Sheets

(56) References Cited

U.S. PATENT DOCUMENTS

| | | | | |
|---|---|---|---|---|
| 3,322,460 | A | 5/1967 | Leverman | |
| 3,379,450 | A | 4/1968 | Jones et al. | |
| 3,964,786 | A | 6/1976 | Mashuda | |
| 4,054,319 | A | 10/1977 | Fogg, Jr. et al. | |
| 4,249,774 | A | 2/1981 | Andreasson | |
| 4,456,086 | A | 6/1984 | Wier et al. | |
| 4,545,616 | A | 10/1985 | Booth | |
| 4,555,121 | A | 11/1985 | Lockard et al. | |
| 4,569,094 | A | 2/1986 | Hart et al. | |
| 4,569,556 | A | 2/1986 | Pillot | |
| 4,632,455 | A | 12/1986 | Schiller et al. | |
| 4,725,056 | A | 2/1988 | Rehrl et al. | |
| 4,732,402 | A | 3/1988 | Lambert | |
| 4,741,547 | A | 5/1988 | Tholkes | |
| 4,744,578 | A | 5/1988 | Stearns | |
| 4,802,542 | A | 2/1989 | Houston et al. | |
| 4,809,804 | A * | 3/1989 | Houston et al. | 180/65.51 |
| 4,861,059 | A | 8/1989 | Shirk | |
| 4,890,853 | A | 1/1990 | Olson | |
| 4,915,373 | A | 4/1990 | Walker | |
| 4,968,050 | A | 11/1990 | Kendrick et al. | |
| 5,054,852 | A | 10/1991 | Tholkes | |
| 5,108,202 | A | 4/1992 | Smith | |
| 5,172,925 | A | 12/1992 | Kendrick et al. | |
| 5,230,113 | A | 7/1993 | Foster et al. | |
| 5,242,180 | A | 9/1993 | Bergeron | |
| 5,265,689 | A | 11/1993 | Kauffmann | |
| 5,294,027 | A | 3/1994 | Plastina | |
| 5,316,370 | A | 5/1994 | Newman | |
| 5,340,139 | A | 8/1994 | Davis | |
| 5,366,036 | A | 11/1994 | Perry | |
| 5,484,151 | A | 1/1996 | Tholkes | |
| 5,489,258 | A | 2/1996 | Wohnsen et al. | |
| 5,542,746 | A * | 8/1996 | Bujaryn | 297/423.12 |
| 5,582,464 | A | 12/1996 | Maymon | |
| 5,586,961 | A | 12/1996 | Quint | |
| 5,611,758 | A | 3/1997 | Rodgers | |
| 5,709,633 | A | 1/1998 | Sokol | |
| 5,718,442 | A | 2/1998 | Alexander et al. | |
| 5,772,226 | A | 6/1998 | Bobichon | |
| 5,803,545 | A | 9/1998 | Guguin | |
| 5,829,766 | A | 11/1998 | Gohlert | |
| 5,860,899 | A | 1/1999 | Rassman | |
| 5,884,935 | A | 3/1999 | Tholkes | |
| 5,924,962 | A | 7/1999 | Rodgers, Jr. | |
| 5,961,179 | A * | 10/1999 | Dixon et al. | 297/173 |
| 5,984,338 | A | 11/1999 | Meyer | |
| 5,984,411 | A | 11/1999 | Galumbeck | |
| 6,125,957 | A | 10/2000 | Kauffmann | |
| D434,198 | S | 11/2000 | Greaves | |
| 6,152,478 | A | 11/2000 | Hung | |
| 6,224,154 | B1 | 5/2001 | Stoki | |
| 6,231,067 | B1 | 5/2001 | Johnson et al. | |
| 6,270,101 | B1 | 8/2001 | Hase | |
| 6,277,056 | B1 | 8/2001 | McBride et al. | |
| 6,368,252 | B1 | 4/2002 | Stearns | |
| 6,368,260 | B1 | 4/2002 | Crews | |
| 6,382,725 | B1 | 5/2002 | Carroll | |
| 6,425,634 | B1 | 7/2002 | Romero | |
| 6,439,657 | B1 * | 8/2002 | Tholkes | 297/172 |
| 6,440,046 | B1 * | 8/2002 | Tholkes | 482/142 |
| 6,527,340 | B1 | 3/2003 | Finch et al. | |
| 6,533,304 | B2 | 3/2003 | Lizama-Troncoso et al. | |
| 6,601,869 | B2 | 8/2003 | Porcheron | |
| 6,619,681 | B2 | 9/2003 | Gutierrez | |
| 6,862,762 | B1 * | 3/2005 | Johnson et al. | 378/177 |
| 6,953,222 | B2 | 10/2005 | Larrick et al. | |
| 7,036,512 | B2 | 5/2006 | Harnois | |
| 7,077,416 | B2 * | 7/2006 | Duarte | 280/304.1 |
| 7,077,792 | B2 | 7/2006 | Nerenberg | |
| 7,219,912 | B2 * | 5/2007 | Meyer | 280/304.1 |
| 7,540,565 | B2 | 6/2009 | Lipford | |
| 7,614,639 | B2 | 11/2009 | Tholkes | |
| 8,141,949 | B2 * | 3/2012 | Baru | 297/217.3 |
| 2002/0149168 | A1 | 10/2002 | Brown | |
| 2002/0167205 | A1 | 11/2002 | Tholkes et al. | |
| 2005/0006878 | A1 * | 1/2005 | Laffin | 280/642 |
| 2006/0097557 | A1 | 5/2006 | Tholkes et al. | |
| 2009/0186747 | A1 | 7/2009 | Lokken et al. | |
| 2010/0007180 | A1 | 1/2010 | Ovre et al. | |

OTHER PUBLICATIONS

Response from U.S. Appl. No. 12/169,492 dated Jul. 5, 2011.

Notice of Allowance from U.S. Appl. No. 12/169,492 dated Sep. 28, 2011.

Response from U.S. Appl. No. 12/354,992 dated Nov. 22, 2010.

Office action from U.S. Appl. No. 12/354,992 dated Feb. 7, 2011.

Notice of Allowance from U.S. Appl. No. 12/354,992 dated Nov. 16, 2011.

Office action from Canadian Application No. 2,523,067 dated Jul. 21, 2010.

Response from Canadian Application No. 2,523,067 dated Jan. 20, 2011.

Office action from Canadian Application No. 2,523,067 dated Apr. 11, 2011.

Response to office action from Canadian Application No. 2,523,067 dated Oct. 11, 2011.

Office action from Canadian Application No. 2,523,067 dated Nov. 10, 2011.

International Search Report and Written Opinion from PCT/US99/27298 dated May 23, 2000.

International Preliminary Examination Report from PCT/US99/27298 dated Apr. 3, 2001.

Response from U.S. Appl. No. 11/247,961 dated Jun. 15, 2009.

Notice of Allowance from U.S. Appl. No. 11/247,961 dated Jul. 21, 2009.

Office action from U.S. Appl. No. 12/169,492 dated Sep. 2, 2010.

Office action from U.S. Appl. No. 12/354,992 dated Jul. 21, 2010.

European Search Report from Application No. 05292130.1 dated Dec. 19, 2005.

Communication from EP Application Serial No. 05292130.1 dated Jan. 16, 2006.

Communication from EP Application No. 05292130.1 dated Nov. 23, 2006.

Response from EP Application No. 05292130.1 dated Jun. 4, 2007.

Communication from EP Application No. 05292130.1 dated Apr. 24, 2008.

Communication from EP Application No. 05292130.1 dated Aug. 26, 2008.

Response from EP Application No. 05292130.1 dated Oct. 15, 2008.

Communication from EP Application No. 05292130.1 dated Dec. 17, 2009.

Response from EP Application No. 05292130.1 dated Jun. 17, 2010.

Prime Engineering, Grandstand II-Hydraulic Assisted Standing System, 2 pgs., date unknown.

Stand Aid, two page brochure, Stand Aid of Iowa, Inc., date unknown.

Superstand, Pediatric Standing System, Prime Engineering, 2 page brochure, date unknown.

"Lifestand" Lifts Body and Soul 2 page brochure, Lifestand, date unknown.

Levo USA product brochure, Levo Stand-up Wheelchair, 3 pages, date unknown (at least as early as 1999).

Independence Providers, Inc., Lifestand, Standing Wheelchair brochure, 8 pgs., date unknown.

"The Art of Standing", Axiom, Prime Engineering, 2 pg. brochure, date unknown.

Altimate Medical, EasyStand, 7000 Series Magician brochure, copyright 1998, 4 pgs.

Altimate Medical, EasyStand Family of Standing Products, 3 pgs., copyright 1998.

EasyStand 5000 Owner's Manual brochure, 11 pgs., copyright May 1996.

EasyStand, 5000 Series brochure, 8 pgs., copyright 1998, Altimate Medical.

Easy-Stand by Alt Inc. two page brochure, date unknown.

Standing Update, Altimate Medical, 4 page brochure, Spring 1998, vol. 2, No. 1.

(56) References Cited

OTHER PUBLICATIONS

Why sit when you can Stand-N-Go?, two page brochure, date unknown.
Your Alternative for Mobility, The Rifton Mobile Stander, two page brochure, date unknown.
Permobil Ltd. product brochure, Professional Rehab Series, The Art of Mobility, C5000 Vertical, The Art of Mobility, 2 pages, date unknown.
European Search Report from Application No. 04292130 dated Dec. 19, 2005.
"Symmetry—The First Shear Reducing Solid Seat Standing System", http://www.primeengineering.com, Prime Engineering, 2004.
"Standing TranStander, 71," http://www.rifton.com/r/Standing/SupineStanders,Rifton Equipment, Community Products, LLC, 2004.
"Gazelle by R82,", http://www.snugseat.com/gazelle.com, Snug Seat, Inc., 2 page web printout dated: Feb. 7, 2006.
Office action from U.S. Appl. No. 11/247,961 dated Sep. 30, 2008.
Amendment from U.S. Appl. No. 11/247,961 dated Mar. 26, 2009.
Office action from U.S. Appl. No. 11/247,961 dated Apr. 23, 2009.
Communication from European Patent Application Serial No. 05292130.1 dated Jan. 16, 2006.
Stand Aid of Iowa, Standing Frames, 3 page web printout dated Oct. 12, 2007 from http://www.stand-aid-com/standing__frames__power__standing__frames.htm.
Prime Engineering, the Art of Standing, 2 page web printout dated Oct. 12, 2007 from http://www.primeengineering.com/index.php?n=38&id=43.
AltimateMedical, EasyStand Evolv, Owner's Manual, 2007.
EasyStand Evolv, pp. 8-13 from easystand.com, copyright 2007, Altimate Medical.
Communication from EP Application No. 10181004.2 dated Oct. 2, 2012.
Communication from EP Application No. 10185520.3 dated Oct. 2, 2012.
Response to Office Action in EP Application No. 10181004.2 dated Dec. 4, 2012.
Response to Office Action in EP Application No. 10185520.3 dated Dec. 4, 2012.
Response and Amendment from Canadian Application No. 2,523,067 dated May 10, 2012.
Non-final rejection from U.S. Appl. No. 13/404,646 dated Jun. 6, 2012.

* cited by examiner

MODULAR STANDING FRAME

RELATED APPLICATION

This application is a divisional application of U.S. Ser. No. 11/247,961 filed on Oct. 11, 2005 titled MODULAR STANDING FRAME which claims the benefit of U.S. Provisional Application No. 60/618,055, filed on Oct. 12, 2004 both of which are hereby incorporated herein in their entirety by reference.

BACKGROUND OF THE INVENTION

The present invention relates to a standing frame that may be adapted for multiple uses including as a workstation, an exercise device, and as a mobility aid.

Standing frames are devices adapted to support an individual in a weight bearing position. Typically, these devices lift and support the user in moving from a sitting posture to a standing posture. The benefits of standing for a person not able to do so on their own are manifold. Even where there is little or no control over the muscle groups that normally support a user of a standing frame in a standing posture, the standing posture itself improves blood flow, increases bone density, improves flexibility and range of motion, and can improve the user's sense of well being by simply allowing the user to stand.

One problem associated with standing frames is that these devices are generally purpose specific; they cannot be used for multiple purposes. For instance, one type of prior art standing frame may be used as a workstation in both a standing and sitting position, but offers does not allow for any significant exercise of the user's lower extremities. Similarly, a standing frame adapted to provide exercise for a user has little utility as a workstation. Accordingly, users are often forced to purchase more than one of these devices, each being purpose built for specific activities.

Another issue common to standing frames is that of adjustability. As a standing frame must accommodate users of varying size, it is difficult to provide a suitable range of adjustment for all of these users. This is particularly evident as the standing frame moves a user from a sitting posture to a standing posture. The complex movements of the body during this process magnify the misalignment of the parts of a standing frame are result in what is referred to as 'shear'. Shear is defined as the relative motion of a user with respect to the standing frame. Ideally, as the standing frame raises a user from a sitting posture to a standing posture, or vice versa, the motion of the components of the standing frame move either more or less than does the body of the user. This may result in something as prosaic as one or more of the component of the standing frame sliding past the user's body, thereby shifting the user's clothing. The lack of adjustment common to many standing frames may also result in an uncomfortable alignment of the user's body.

Accordingly, there is a recognized need to provide a multiuse standing frame that is affordable to a larger segment of the disabled population. There is also a need to provide increased adjustment capabilities in a standing frame to minimize or eliminate shear and to simultaneously accommodate a wider range of users.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

SUMMARY OF THE INVENTION

In one embodiment, a modular standing frame includes a chair module, a glider module, a workstation module, and a mobility module. The glider module, workstation module, and mobility module are interchangeably connectable with the chair module.

Other embodiments are described and claimed.

DETAILED DESCRIPTION

Figure 1:
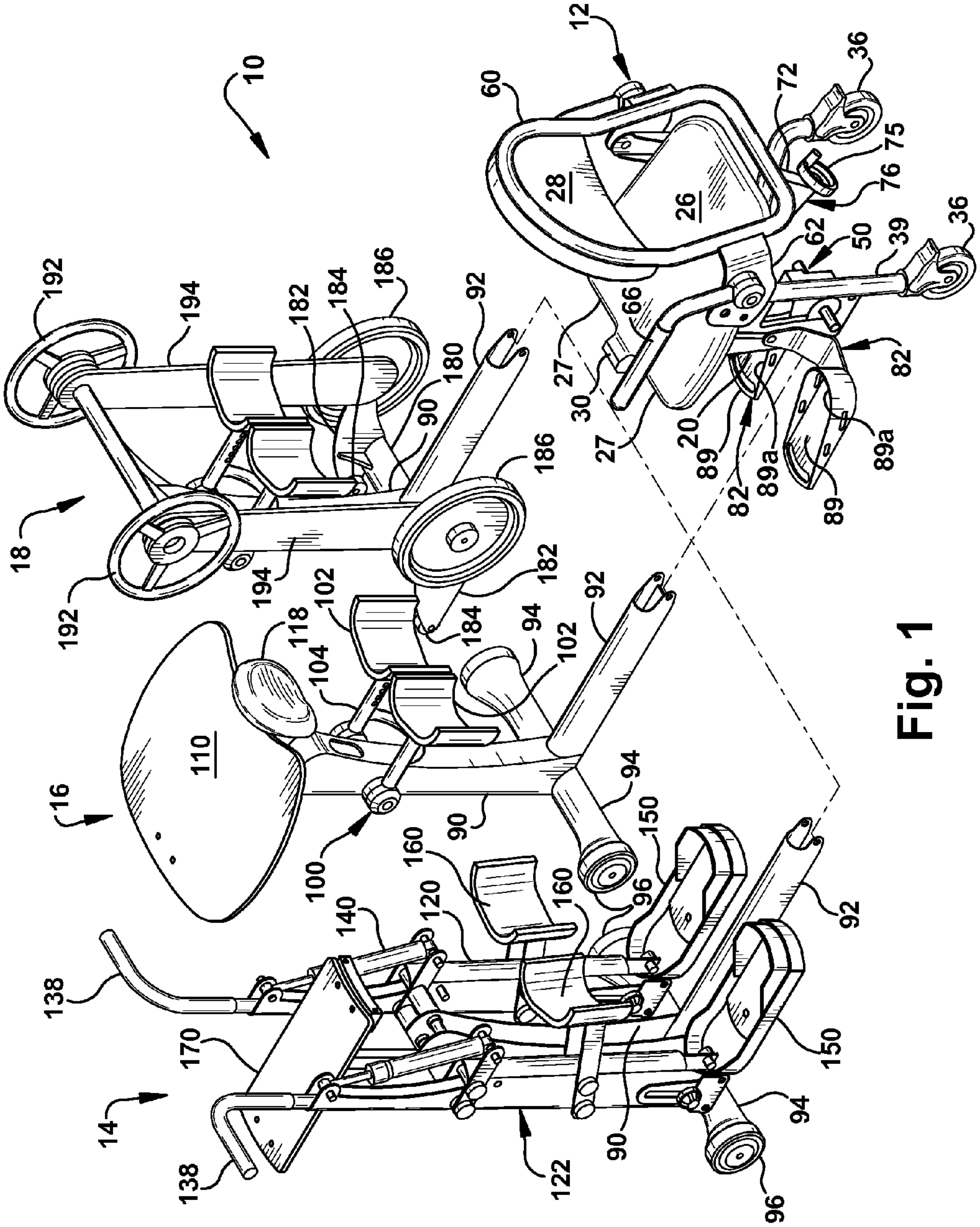
FIG. 1 is an exploded view of an embodiment of a modular standing frame of the present invention, showing the various modules in relation to one another.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 is an exploded view of the various modules of one embodiment of a modular standing frame 10 of the present invention. The standing frame 10 includes a chair nodule 12, a glider module 14, a workstation module 16, and a mobility module 18. In use, the chair module 12 is coupled to one of the glider, workstation, or mobility modules 14, 16, or 18, respectively.

Figure 2:
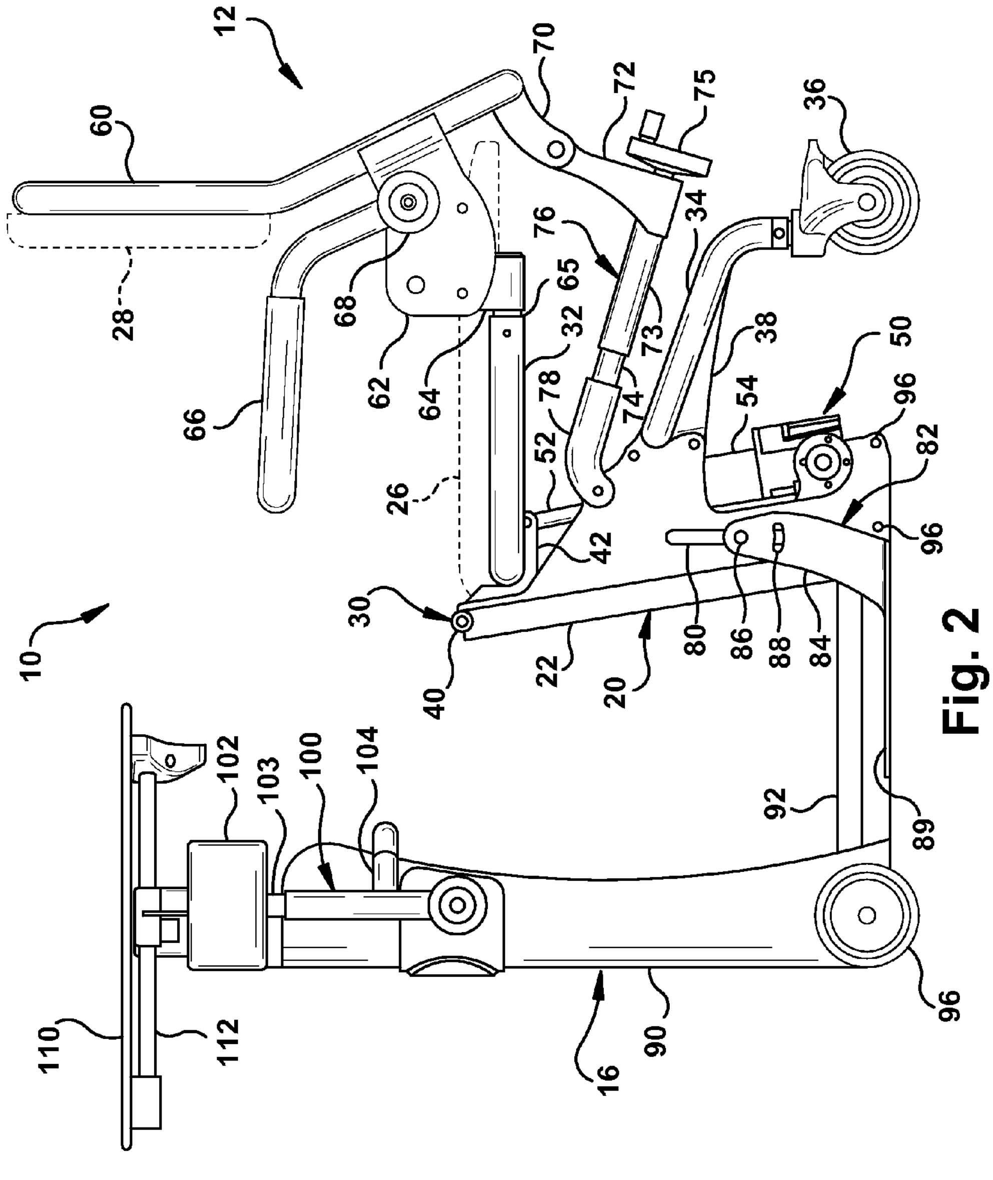
FIG. 2 is a side elevation of an embodiment of the modular standing frame in which a seat module is coupled to a workstation module.
Figure 3:
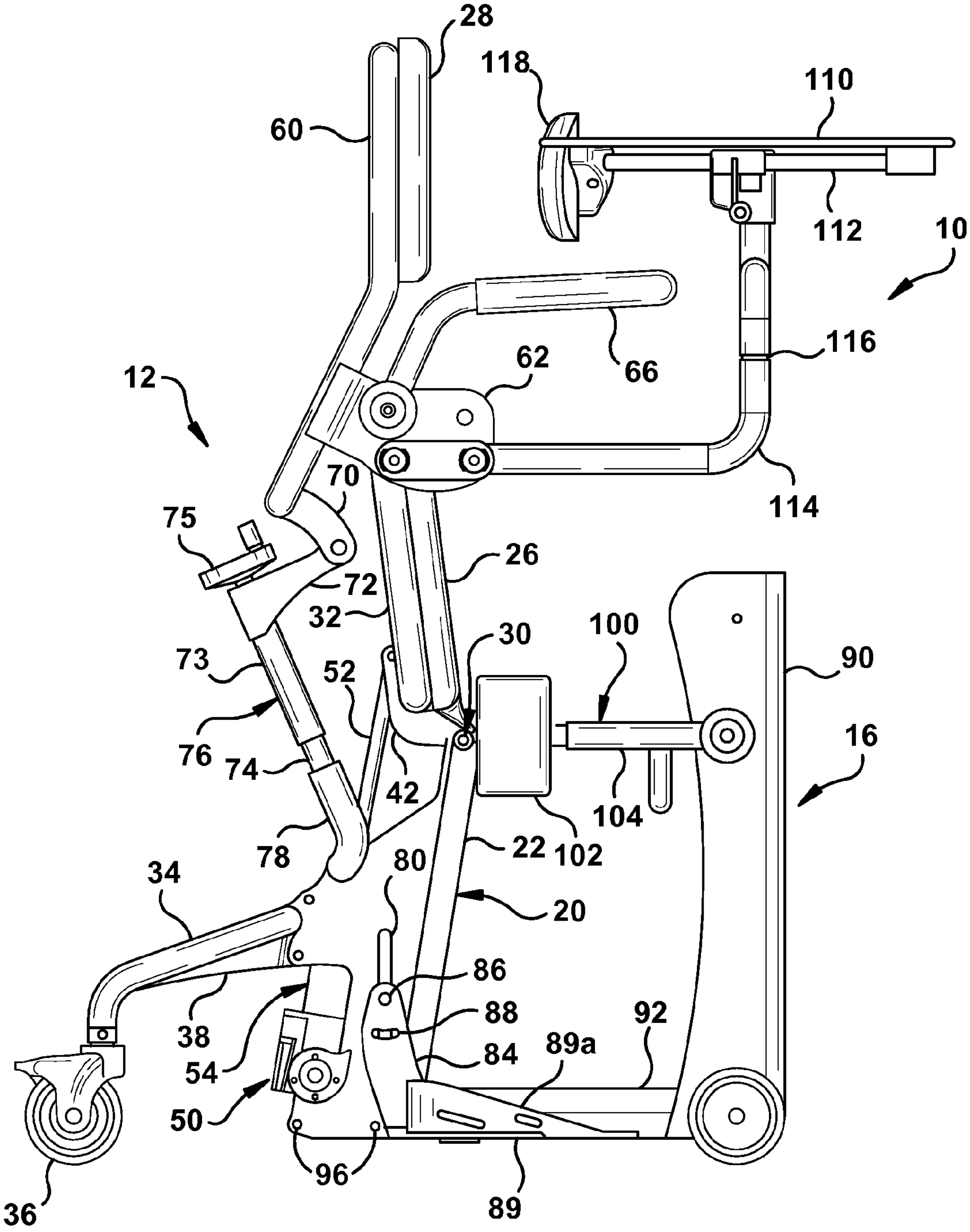
FIG. 3 is a side elevation of the modular standing frame of FIG. 2 in which the seat module is positioned in a standing posture.
Figure 3B:
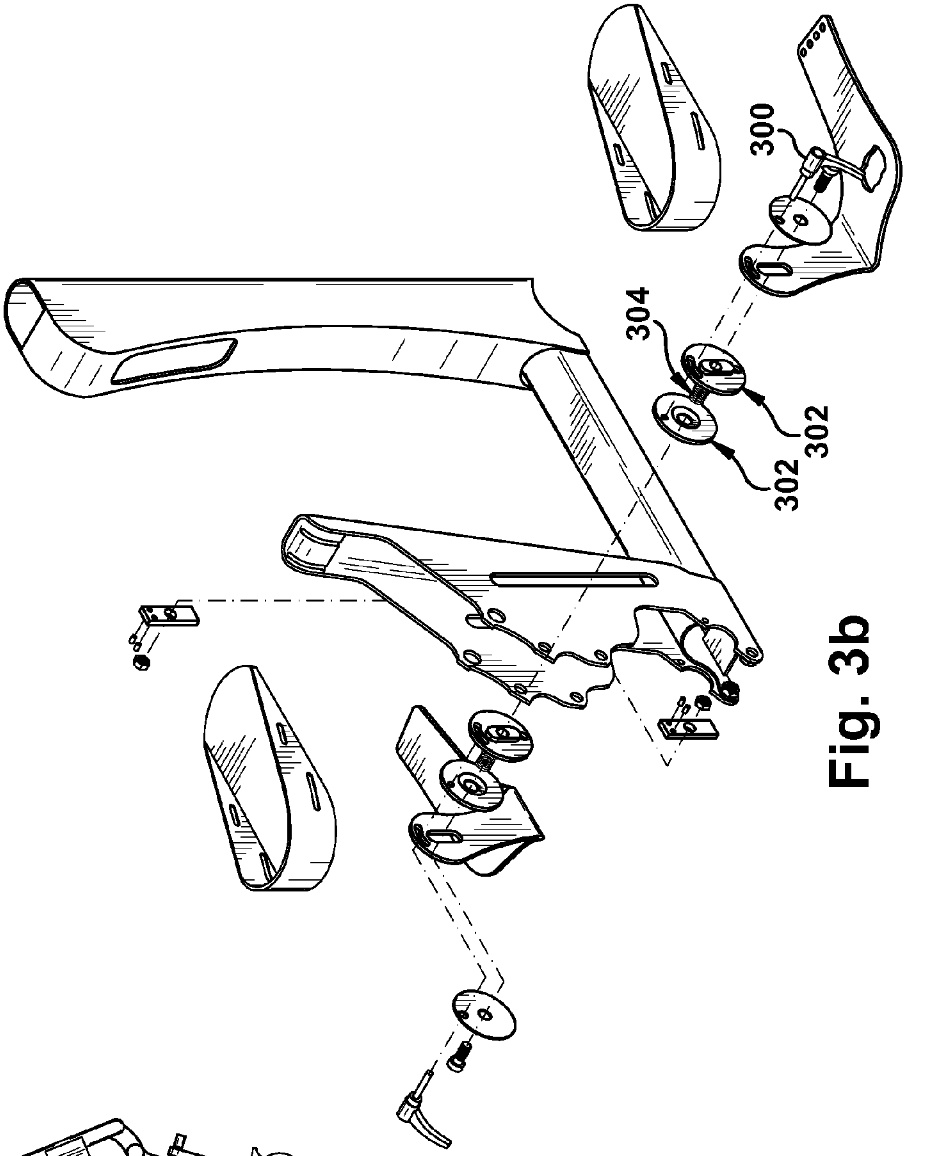
FIG. 3*b* is an exploded view of a foot rest according to another embodiment.

Turning next to FIGS. 2 and 3, the chair module 12 has a seat 26 and a seat back 28 that are constructed and arranged on an articulated framework to raise and lower a user of the standing frame 10 between a lower, seated posture and an upper, standing posture. The chair module 12 may also be used to support a user in postures that fall between the seated and standing postures mentioned above. In FIGS. 2 and 3, the chair module 12 is coupled to the workstation module 16. This combination is useful for those users that need to be supported in relation to a work surface.

In one embodiment, the chair module 12 is built around a support member 20. An offset hinge 30 couples a lower seat frame 32 to the upper end of the support member. The seat 26 is secured to and rotates with the lower seat frame 32. The lower end of the support member 20 is adapted for coupling the chair module 12 to one of the remaining modules to form a complete standing frame 10. The support member 20 is preferably formed of a heavy gauge steel and may be thick enough to form threaded connections directly thereto, or may have threaded bosses formed or attached thereto for the purpose of securing the remainder of the chair module thereto.

In FIG. 2 it can be seen that the support member 20 inclines rearwardly down from the offset hinge 30. In this manner, the lower end of the support member 20 is moved rearwardly beneath the seat such that the location at which the chair module 20 is coupled to another module is conveniently out of the way of the feet and legs of the user of the standing frame 10. This is also advantageous in that the rear leg bracket 34, to which are attached wheels 36, are relatively shorter and accordingly stresses thereon are minimized. The rear leg bracket 34 may be rotatively or fixedly attached to the support member 20, as needed. A gusset 38 may be coupled between the bottom surface of the rear leg bracket 34 and the support member 20 to stiffen the joint between the support member 20 and the rear leg bracket 34. In another embodiment, the gusset 38 may be omitted in favor of a mechanism (not shown) for adjusting the angle of the rear leg bracket 34. Note that the wheels 36 preferably swivel and are fully lockable to ensure that the standing frame 10 will remain in place during use. In some embodiments, it may be necessary to include a battery and/or other ancillary equipment on the chair module 12. In these instances, it may be desirable to include a bracket or other mechanism that couples the battery and/or ancillary equipment to the rear leg bracket 34 of chair module 12. The distance between the floor and the rear leg bracket 34 allows for a patient lift (not shown) to be used in transferring a user into the device.

The offset hinge 30 has a two part barrel 40, first portion of which is affixed to the upper end of the support member 20 and the second portion being affixed to an elongate hinge leaf 42. The hinge leaf 42 extends downwardly and rearwardly from the barrel 40 and curves beneath a central area of a lateral cross piece of the U-shaped seat bracket 32. The hinge leaf 42 is fixed to the lower seat frame 32 such that the seat 26 will rotate with the hinge 20.

In one embodiment, the hinge leaf 42 is curvilinear in shape. However, many suitable shapes are possible and even useful. Accordingly, the shape of the hinge leaf 42 is not to be considered limiting in that other usefully shaped hinge leaves may also be used. The leaf 42 of hinge 30 is adapted such that the knee of a user may be aligned with the barrel 40 thereof such that the knee and the hinge rotate about substantially the same axis. See FIGS. 4*a*, 4*b*, and 4*c*. As can be seen in FIG. 1, the seat 26 has cut away portions 27 at its front edge that allow the knees to be aligned with the hinge barrel 40 as described above.

An extensor mechanism 50 is coupled between a lower portion of the support member 20 and the distal end of the hinge leaf 42. The extensor mechanism 50 is in the illustrated embodiment a hydraulic cylinder having a shaft 52 that reciprocates within a piston body 54. As the point at which the shaft 52 is coupled to the hinge leaf 42 is offset from the hinge barrel 40, the actuation of the extensor mechanism 50 to extend the shaft 52 acts to raise the seat 26 as will be more completely described in conjunction with FIGS. 4*a*-4*c*. Similarly, actuation of the extensor mechanism 50 to retract the shaft 52 acts to lower the seat 26. The extensor mechanism 50 may be any useful reciprocable mechanism having the wherewithal to raise and lower the seat 26 with a user seated thereon through the desired range of motion. Furthermore, the extensor mechanism 50 may be manually actuable or may include some means of motive power such as an electric or hydraulic motor. By way of example only, the extensor mechanism 50 may be a screw driven device, a hydraulic cylinder, a pneumatic cylinder, or a mechanical linkage.

The chair module 12 has a seat back 28 that is mounted on an upper seat frame 60. Two hip plates 62 are fixed to the opposing sides of a lower portion of the upper seat frame 60. The hip plates 62 are in turn rotatively pinned to secondary hip plates 64 that are affixed to the opposing sides of the lower seat frame 32. In this manner, the seat frame 60 is coupled to the lower seat frame 32 and yet is free to rotate with respect thereto. In one embodiment, the respective secondary hip plates 64 are fixed to telescoping rods 65 that are received within the tubes of the lower seat frame 32. The telescoping adjustment of the position of the secondary hip plates 64 allows the seat back 28 to be moved forward or backward to accommodate for variations in the length of users' legs. The hip plates 62 act to center the hips of a user on the seat 26, though a lap belt (not shown) may be coupled to the hip plates 62 to ensure that the user is securely positioned on the seat 26. Arms 66 are removably and rotatably coupled to the hip plates 62 by coupling mechanisms 68.

An upper connector arm 70 is affixed to and depends from the lower portion of the upper seat frame 60. The upper connector arm 70 is rotatively pinned to a lower connector arm 72 that is secured at its opposing end to the free end of an adjustment member 76. The adjustment member 76 is, in turn, rotatively pinned to the support member 20 by yoke 78. The adjustment member 76 is adapted such that the distance between the point at which the upper and lower connector arms 70, 72 are joined and the point at which the yoke 78 is coupled to the support member 20 may be modified. In one embodiment, the adjustment member 76 consists of an outer sleeve 73 (to which the lower connector arm 72 is fixed) and a reciprocable shaft 74 that is received within the outer sleeve 73. In the illustrated embodiment, a hand wheel 75 is coupled to a screw (not shown) that extends or retracts the reciprocable shaft 74 to modify the length of the adjustment member 76. In other embodiments, the adjustment member 76 may consist of, among other things, a pneumatic cylinder, a hydraulic cylinder, or an electrically operated screw mechanism.

Figure 3A:
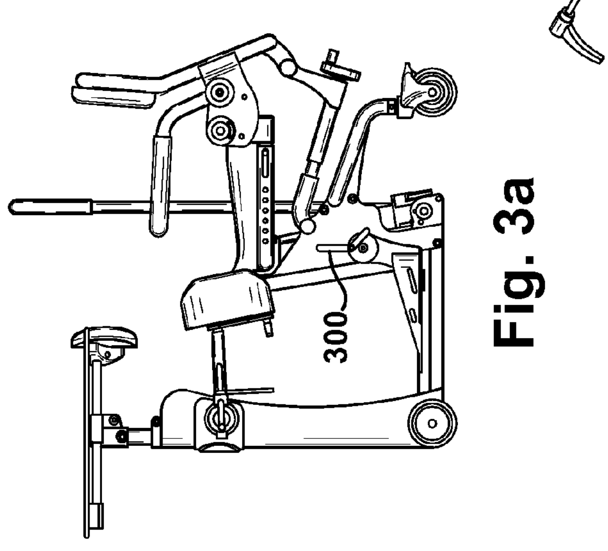
FIG. 3*a* is a side elevation of the modular standing frame showing another embodiment.

The support member 20 includes vertical slots 80 in each side thereof. These vertical slots 80 allow for the slidable attachment of foot rests 82 to either side of the support member 20. Foot rests 82 incorporate an ankle plate 84 having an upper aperture 86 and a lower aperture 88 that are adapted to secure the ankle plate 84 to the support member 20. In one embodiment, the upper aperture 86 is circular and a bolt is passed therethrough and into slot 80 in the support member. The lower aperture 88 is curvilinear in shape and allows the ankle plate 84 to rotate about the bolt received in the upper aperture 86. When the bolts passed through the slot and the upper and lower apertures are loose, the ankle plate may be moved up and down and may also be rotated around the upper aperture 86. By tightening the bolts received in the upper and lower apertures, the ankle plate 84 of the foot rest 82 may be secured in a desired position. Note that the shapes of the upper and lower apertures may be reversed, where so desired. Alternatively, only a single aperture may be used to secure the ankle plate 84 of the foot rest 82 to the slot 80 of the support member 20. By properly adjusting the vertical position and the angular position of the foot rests 82, the knee of a user may be accurately positioned with respect to the hinge 30. Another embodiment of a clamping mechanism is shown in FIG. 3A. This embodiment uses a clamp lever 300 and an adjustment mechanism comprising a pair of tooth clamps 302 and a spring 304 to allow for adjustment of the height of the foot rests 82, and to adjust toe height and toe-up and toe-down configurations. This is shown in greater detail in FIG. 3*a*.

The foot rest 82 has a foot plate 89 that extends generally perpendicularly outward from the ankle plate 84. The foot plate 89 supports the foot of a user and allows the user's legs to be adjusted with respect to the hinge 30. In one embodiment, a skirt 89*a* is affixed to the perimeter of the foot plate 89 to ensure that the user's foot remains on the foot plate 89. In another embodiment, a retaining mechanism, such as a strap or the like (not shown) may be used to secure the foot to the foot plate 89.

In one embodiment, the foot plate 89 is fixed in its perpendicular relationship with the ankle plate 84. In another embodiment, the foot plate 89 may be secured to the ankle plate 84 in such a manner as to be rotatable about an axis designated to allow the foot of the user to supinate or pronate. In this manner, the normal orientation of a user's foot may be accommodated in a comfortable manner that does not require conformation of the user's foot with the foot rest 82. Note that the foot rest 82 may be omitted from the chair module 12 where the module to which the chair module 12 is coupled incorporates a suitable foot rest 82. In one embodiment, the foot skirt 89*a* includes a dimple on its bottom that fits a series of holes on the foot plate 89. This allows the foot skirt 89*a* to be rotated about the heel for a toe in/toe out effect.

Turning now to FIG. 3, the chair module 12 can be seen in its upper, standing posture. The lower seat frame 32, upper seat frame 60, adjustment mechanism 76, and support member 20 essentially form a four-bar linkage that allows the seat back 28 to maintain its attitude with respect to the surface on which the standing frame 10 rests. In this manner, the seat back 26 maintains the users back in the same attitude in both the sitting and standing postures and in transition therebetween. The angle of the seat back 28 may be adjusted by means of the adjustment mechanism 76. For example, by increasing the length of the adjustment mechanism 76 as described hereinabove, lower connector arm 72, through upper connecting arm 70, causes the upper seat frame 60 to rotate forward. Conversely, decreasing the length of the adjustment mechanism 76 causes the upper seat frame 60 to rotate backwards. The four-bar linkage mentioned above, acts to maintain the upper seat frame 60, and hence the seat back 28, in this selected attitude in both the sitting and standing postures and in transition therebetween.

In FIG. 3, the chair module 12 is coupled to the workstation module 16. The workstation module 16 has a structural backbone that consists of column 90 and coupling bar 92. Column 90 and coupling bar 92 are connected using bolts or welds. Coupling bar 92 is in turn coupled to the support member 20 of the chair module 12 by means of one or more removable bolts (not shown), though where a dedicated use standing frame is desired, the coupling bar 92 may be permanently connected to the support member 20. The column 90 is supported and steadied by a pair of arms 94 that extend laterally from the junction of the column 90 and the coupling bar 92. Where the standing frame 10 is to be mobile, arms 94 are provided with wheels 96 at the ends thereof.

The workstation module 16 has a knee support 100 rotatively coupled to the column 90. The knee support 100 rotates between an upper position (as seen in FIG. 2) and a lower position (as seen in FIG. 3). The knee support 100 is moved into its lower position when a user of the standing frame 10 desires to stand. The knee support 100 cradles the knees of the user to ensure that the legs of the user maintain the proper position as the user is moved into a standing posture by the chair module 12. The knee support 100 prevents injury to the user and ensures that the legs are maintained in a weight bearing attitude. When the user is in a sitting posture, the knee support 100 may be moved to its upper position where the knee support is out of the way. The knee support 100 includes a pair of knee braces 102 that are shaped to wrap at least partially around the anterior surface of the knees of the user. The knee braces 102 are mounted on a rotatable frame 104 that is coupled to the column 90. In one embodiment, the knee braces 102 are mounted on telescoping shafts 103 that are received within the tubular members of the rotatable frame 104. In this embodiment, the position of the knee braces 102 may be adjusted toward and away from the user. What is more, in some embodiments, the knee braces 102 will be independently adjustable. The knee support being capable of being moved out of the way as described above allows for more space between column 90 and support member 20 when a user is getting into the device.

Workstation module 16 has a work surface 110 upon which the user of the standing frame 10 may place items. As seen in FIG. 2, the work surface 110 is coupled to the top of the column 90 by means of an adjustable slide 112 that permits the work surface 110 to be moved toward and away from a user. In one embodiment, the adjustable slide 112 is coupled to a D-shaped vertical shaft 113 that is received within the column 90. See FIGS. 7*a*, 8*a*, and 9*a*. The D-shape of the vertical shaft 113 prevents the work surface 110 from rotating around a vertical axis. This embodiment ensures that the chest pad 118 secured to the edge of the table closest to the user will not rotate out of a desired position. In another embodiment, the clamping mechanism 115 used to secure the vertical shaft 113 in place may be adapted to clamp the vertical column 113 in such a manner as to prevent rotation thereof. Where this is the case, the vertical column 113 may be circular in cross section and may be allowed to rotate when clamp 115 is loosened. Note that if the work surface 110 is to be used in a standing posture, the work surface 110 must be raised to a position in which the chest pad 118 engages the chest of the user. In another embodiment, the work surface 110 is adjustable in tilt as well as vertically and horizontally.

Where the user desires to stand, the work surface 110 and the adjustable slide 112 upon which it is mounted may be removed from the column 90 and mounted on an adjustable armature 114 as seen in FIG. 3. The armature 114 may be provided with a joint 116 for rotation or may be rigid, though it is to be understood that the joint 116 may be provided with a locking mechanism that selectively enables/disables the rotation of the armature 114 above joint 116. The armature 114 is coupled to the hip bracket 62 of the chair module 12, and like the arm rests 66, maintains a desired orientation with the seat back 28 as the chair module 12 moves from its lower, sitting posture to its upper, standing posture. Note that the armature 114 may be mounted on either side of the chair module 12, depending on the needs of the user. Where the standing frame 10 is to be used in a standing posture or mode, it is desirable to provide the work surface 110 with a chest pad 118. The chest pad 118 is coupled to the adjustable slide 112 and acts to support and stabilize the torso of a user of the standing frame when the user is in a standing posture. The chest pad 118 forms a forward barrier that works in conjunction with the seat back 28 to limit the front to back motion of the user, where needed. As can be appreciated, where the user does not require such support, the chest pad 118 may be omitted. Similarly, the chest pad 118 may be omitted when the chair module 12 is in its lower, sitting posture.

The adjustable slide 112 is adapted to provide the structural support required for the proper functioning of the chest pad 118. Accordingly, the adjustable slide 112 is constructed and arranged to lock in the adjustments enabled thereby to provide the required structural support and rigidity.

Figure 4B:
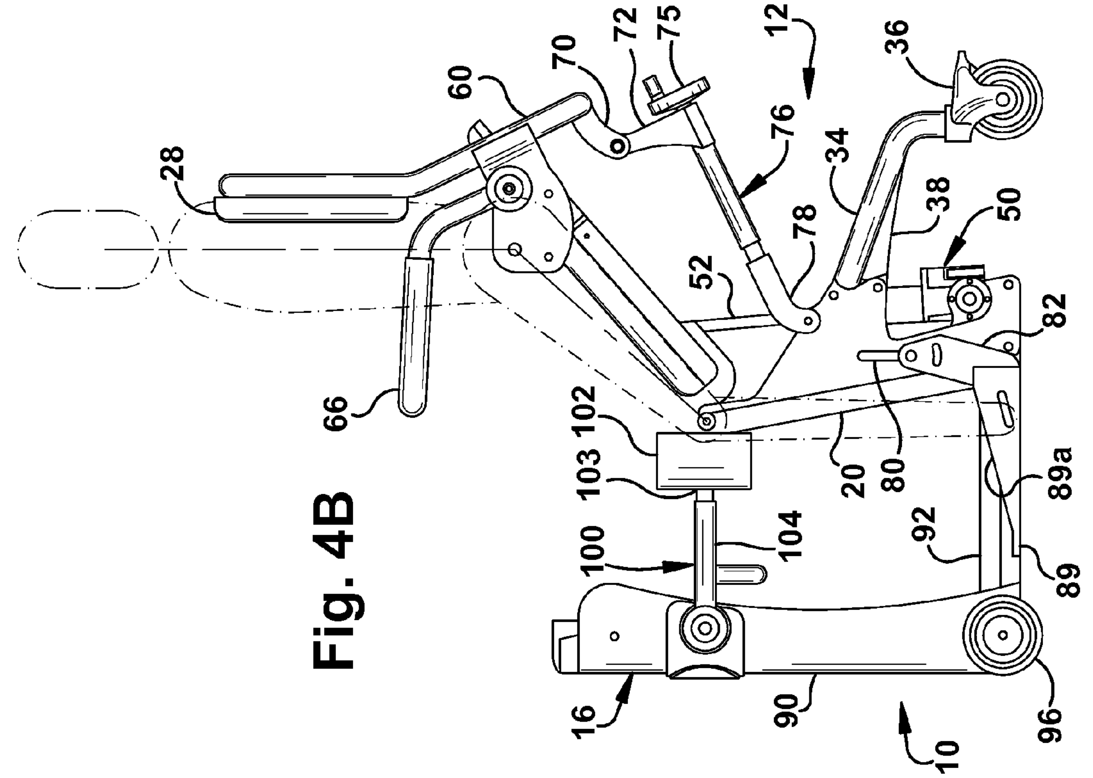
FIG. 4*b* illustrates an embodiment of the seat module in transition between a sitting posture and a standing posture.
Figure 4A:
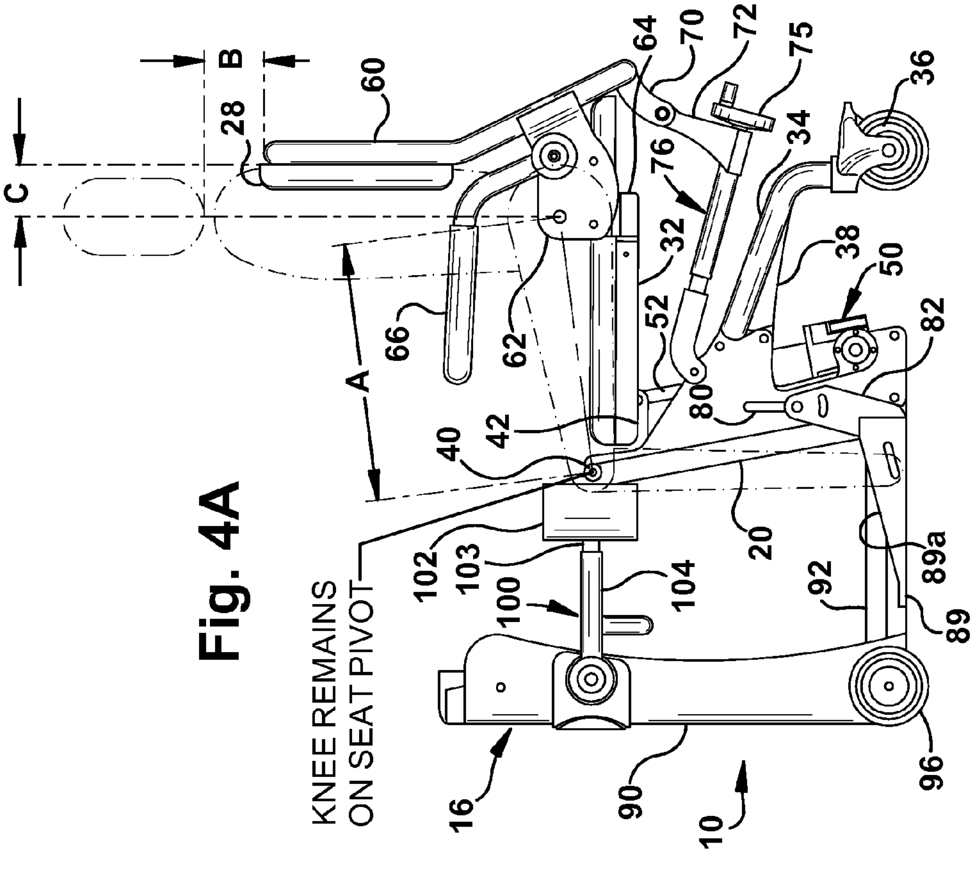
FIG. 4*a* illustrates an embodiment of the seat module in a sitting posture.
Figure 4C:
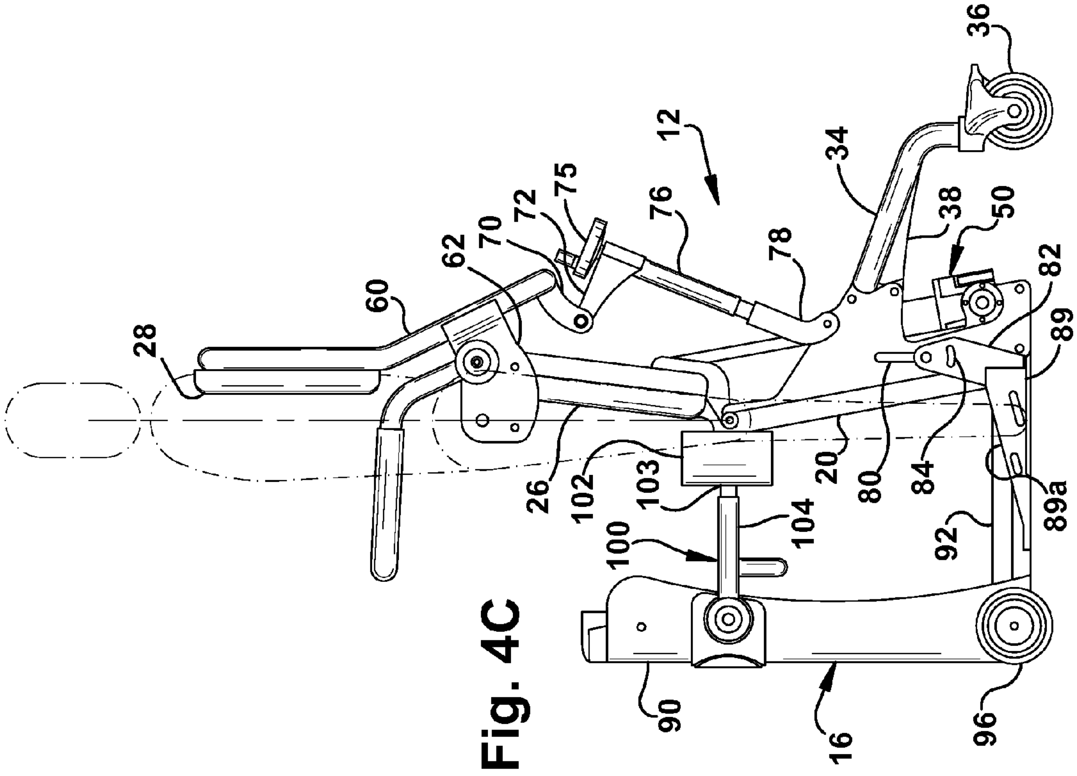
FIG. 4*c* illustrates an embodiment of the seat module in a standing posture.

FIGS. 4*a*, 4*b*, and 4*c* illustrate the sitting posture, transition, and standing posture of a user in the chair module 12, respectively. Turning first to FIG. 4*a*, a user (shown in phantom) is seated on the chair module 12. In FIGS. 4*a*-4*c* the chair module 12 is coupled to a workstation module 16 from which the work surface 110 has been removed for clarity's sake. FIG. 4*a* is illustrative of how the standing frame 10 is adjusted to accommodate a particular user's phenotype. In adjusting the standing frame 10, the user is first seated on the seat 26 with the user's knees aligned as closely as possible with the hinge 30. Secondary hip plates 64 are then adjusted toward or away from the knees of the user so that the seat back 28 will accommodate the length of the particular user's thighs. The secondary hip plates 64 are positioned such that the joint that secures the secondary hip plates 64 to the hip plates 62 is substantially aligned with the hip joints of the user. This distance is indicated by reference character "A" in FIG. 4*a*. Note that this distance may be measured prior to seating the user and/or set directly after the user has been seated.

The adjustment mechanism 76 is then employed to ensure that the seat back 28 is set at an appropriate and comfortable angle. The distance between the seat back 28 and the point at which the hip plates and secondary hip plates are joined is indicated by reference character "C" in FIG. 4*a*. Distance C will vary from user to user. Note that the distance C is measured perpendicularly from the seat back 28 and its measurement is therefore independent of the angle at which the seat back 28 is maintained. The position of the seat back 28 on the back of a user is indicated by reference character "B" in FIG. 4*a*. While the seat back 28 may in some embodiments be provided with an adjustment mechanism that allows the seat back 28 to be moved vertically with respect to the seat bottom 26, the distance represented by "B" is more indicative of the relative position of the seat back 28 on the back of the user.

The foot rests 82 are then vertically adjusted with the slots 80 to accommodate the length of the user's lower legs. As described above, the relative distances and angles required for adjusting the foot rests 82 may be measured prior to seating the user, or may be directly set after the user has been seated. The ankle plate 84 of the foot rest 82 is rotated to achieve a comfortable position for the user's legs. The foot plate 89 may also be rotated to achieve a desirable supinated or pronated position for the user's feet. Preferably the position of the user's lower legs and feet will be such that the selected position is suitable for either the sitting or standing postures of the chair module 12. In some instances however, this may not be possible and therefore it is contemplated that the foot rests 82 may be adjusted differently for the sitting and standing postures.

Once the chair module 12 has been suitably adjusted and retaining straps or the like are employed (if present), the knee support 100 is rotated down into its lower position as shown in FIG. 4*a*. The individual knee braces 102 are then adjusted toward or away from the user to ensure that the braces 102 appropriately engage the knees of the user. Once the knee braces 102 are properly adjusted, the chair module 12 may be actuated to raise the user from a sitting posture to a standing or semi-standing posture. As described above, the user is raised from a sitting posture to a standing or semi-standing posture by activating the extensor mechanism 50.

As the shaft 52 of the extensor mechanism 50 is extended, the lower seat frame 32 and the seat bottom 26 mounted thereon are forced upward. As the lower seat frame 32 rotates about hinge barrel 40, the user is lifted thereon. Normally, as the seat 26 is lifted and inclined, the user would tend to slide down and off the inclined seat bottom 26. However, as the knee support 100 has been adjusted to engage and support the knees of the user, the user is maintained securely on the seat 26. More importantly, the knee support 100 maintains the alignment of the user's knee and hip joints with the hinge 30 and secondary hip plates 64, respectively. It should be noted that the complex shape of the hinge leaf 42 of the hinge 30 maintains an offset between the hinge barrel 40 and the lower seat frame 32. This offset is useful in ensuring that the user is raised from a sitting posture in an ergonomic manner. In addition, the offset is such that there is little or no shear between the user's legs and seat and the seat 26 of the chair module 12, thereby maintaining the alignment of the user with the chair module 12. Similarly, there is little or no shear between the user's back and the seat back 28 of the chair module 12.

As the lower seat frame 32 and seat 26 are rotated upward, as seen in FIG. 4*b*, the upper seat frame 60 and its seat back 28 are carried along. However, the upper seat frame 60 and seat back 28 are constrained to maintain its original attitude with respect to the user's back by the adjustment mechanism 76. Accordingly, the user's upper body is maintained in the same orientation or attitude as the user is raised toward a standing posture. Similarly, the arm rests 66 also maintain a constant orientation with respect to the seat back 28. As the user is raised with the seat 26 and seat back 28, the alignment of the user's knee and hip joints with the hinge 30 and hip plates 62, taken together with the rotation of the seat 26 and seat back 28, act to maintain distances B and C through out the lifting process. In maintaining the distances B and C, the amount of shear experienced by the user is minimized. In one embodiment, the amount of shear experienced by the user between the seat 26 and/or seat back 28 is between zero and one (1) inch.

As can be seen in FIG. 4*c*, when the chair module 12 is in its standing posture, the legs of a user are maintained in a fully extended, weight-bearing attitude. The legs and seat of the user are supported by the seat 26, the back of the user is supported by the seat back 28, and the knees of the user are supported by the knee support 100. As will be appreciated, where the user lacks control of the truncal muscles that maintain an upright posture, the work surface 110 with a chest pad 118 will be required to maintain the user in a standing posture.

Some users may require additional support from the chair module 12, particularly when the chair module raises the user to a standing posture as shown in FIG. 4*c*. In this instance, hip support pads (not shown) may be secured to the lateral edges of the lower seat frame 32 such that the hip support pads engage the user's upper thigh near to the hip. Similarly, lateral support pads (not shown) may be coupled to the upper seat frame so that the pads engage the user's torso in the rib area. The hip and lateral support pads function akin to the knee braces described hereinbelow in that they essentially limit lateral movement of the user's body. This type of support is particularly useful and/or necessary where the user of the standing frame 10 has little or no muscular control of the legs and/or torso.

Figure 4E:
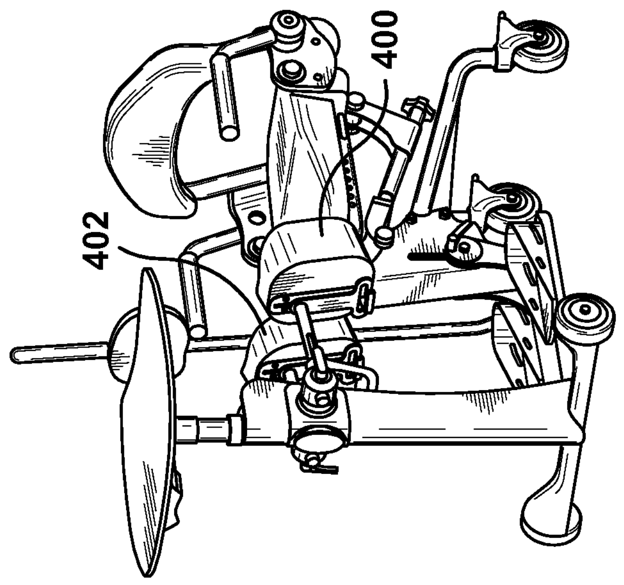
FIG. 4*e* illustrates an embodiment of the independent knee pads in an upper position.
Figure 4D:
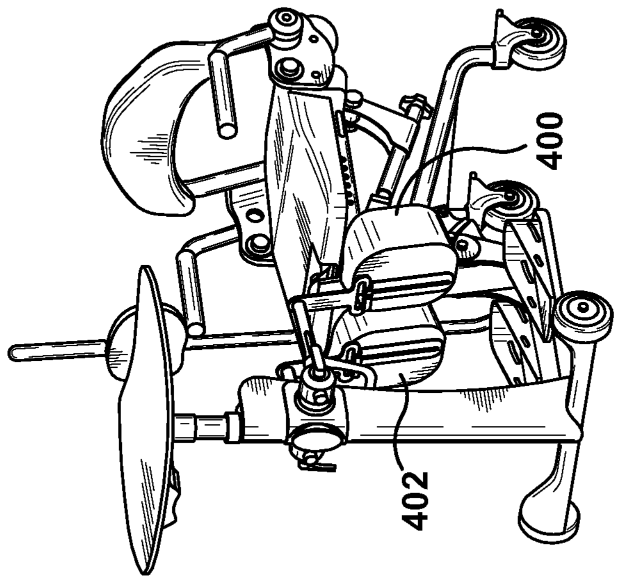
FIG. 4*d* illustrates an embodiment of the independent knee pads in a lower position.

FIGS. 4*d* and 4*e* show further embodiments of the standing frame 10. Frame 10 in FIGS. 4*d* and 4*e* has a pair of independent knees 400 and 402 that are adjustable in height. The knees 400 and 402 provide support for an on the knee configuration in a lower position shown in FIG. 4*d*, and support for an above knee configuration in an upper position shown in FIG. 4*e*.

Figure 4H:
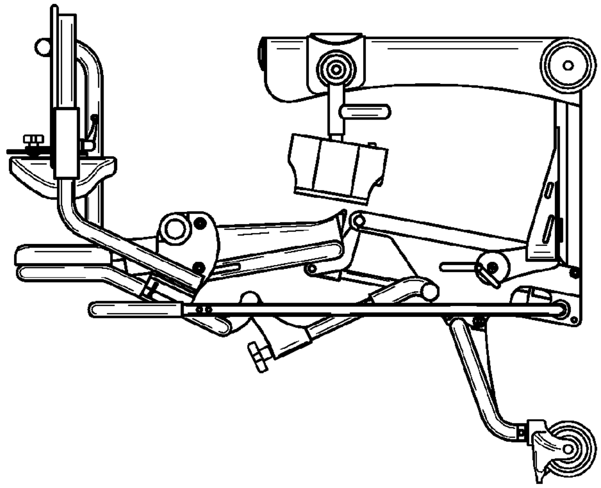
FIGS. 4*f*, 4*g*, and 4*h* illustrate another embodiment of the standing frame.
Figure 4G:
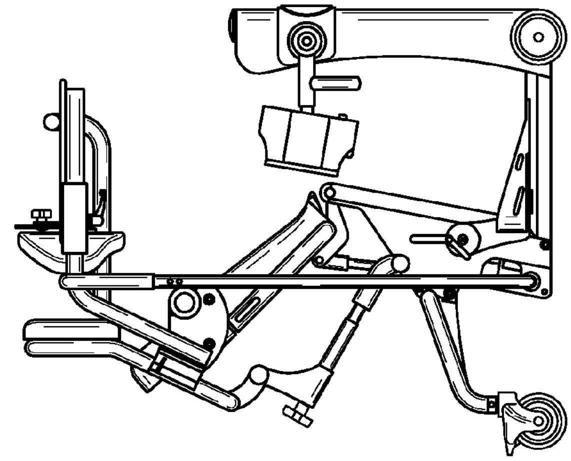
Figure 4F:
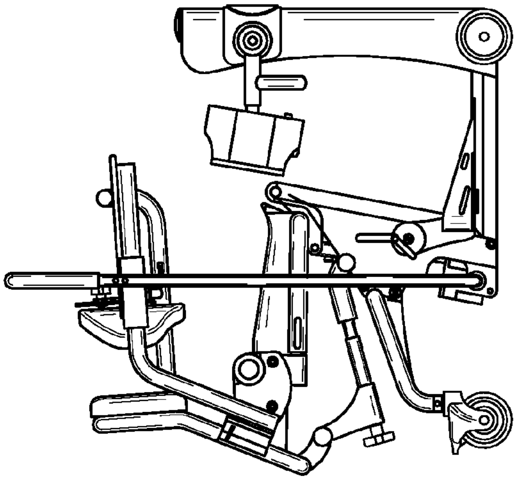

FIGS. 4*f*, 4*g*, and 4*h* show an alternate embodiment in which the standing frame work surface 110 remains in a fixed relative position to the user during a process of raising a user to a standing posture, or any posture between seated and standing. The work surface 110 in this embodiment is always in the same relative position with respect to the user. This embodiment allows a user to stop at any intermediate point in arising and still be able to use the work surface.

Figure 5:
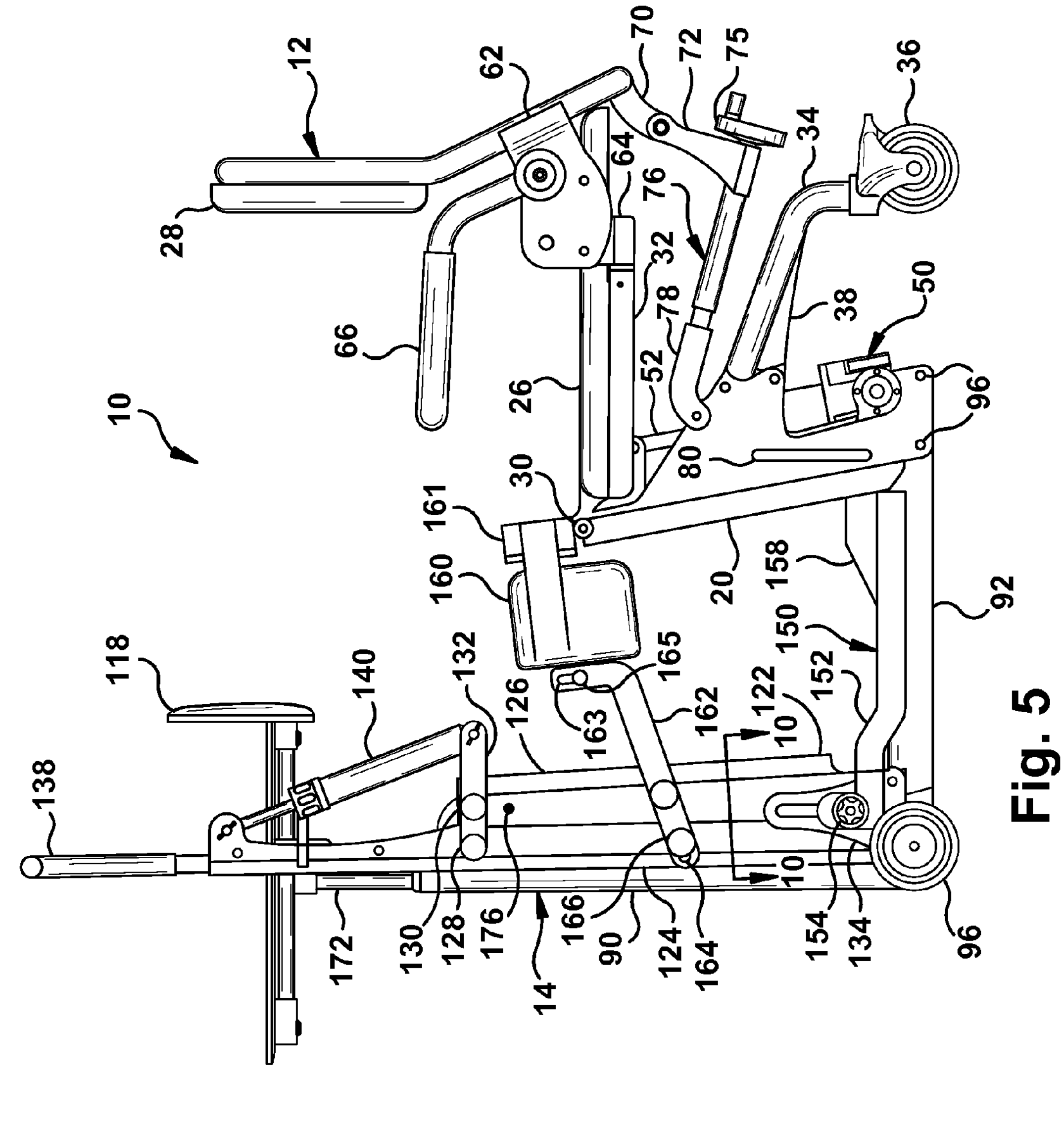
FIG. 5 is a side view of a modular standing frame in which the chair module is coupled to a glider module.

In FIG. 5, the standing frame 10 is configured to combine the chair module 12 with the glider module 14. The glider module 14 is adapted to provide range of motion and exercise therapy for a user of the standing frame 10. The glider module 14 is built upon the same backbone as is the workstation module 16, that is, the glider module 14 has a column 90 and coupling bar 92 that are coupled to the chair module 12 by means of removable bolts 96.

Legs 120 and 122 are coupled to the right and left hand sides of column 90, respectively. The legs 120, 122 support the user of the standing frame 10 in a standing, weight bearing posture and allow the legs of the user to move back and forth in a motion that approximates walking. The walking motion enabled by the legs 120, 122 improves muscle tone, strengthens muscles and connective tissues, and improves the elasticity of the user's musculature and connective tissue.

Figure 10:
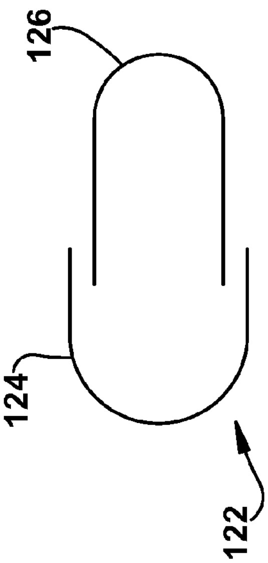
FIG. 10 is a cross sectional view of a typical leg of the glider module.

As the legs 120, 122 of the glider module 14 are mirror images of one another, only the left leg 122 will be described in detail. Leg 122 consists of a pair of partially telescoping, interlocking channels 124, 126. See FIG. 10. Channels 124 and 126 are rotatively coupled to bar 132 and to column 90 by axles 128, 130. Bracket 134 is rotatively pinned to the bottom of channels 124, 126. Bar 132, bracket 134, and channels 124, 126 together form a four-bar linkage. Note that in the illustrated embodiment there are two brackets 134 on each of the legs 122, 124, one on the inside of the leg and the other on the outside of the leg. The interlocking arrangement of the channels 124, 126 makes for a clean appearance and more importantly, eliminates pinch points that could injure a user.

Channel 124 extends above bar 132 and terminates in a handle 138. A resistive element 140 is coupled between an upper portion of the channel 124 above bar 132 and a free end of bar 132. The resistive element 140 acts to resist the rotation of channel 124 of the four bar linkage. The resistive element 140 is in one embodiment a pneumatic cylinder that offers variable resistance. Alternatively, the resistive element may be a hydraulic cylinder or suitable elastomeric device or material. Preferably, the resistive element will resist the reciprocation of the four-bar linkage with a combination of resilient and dissipative functionality.

As the users, feet must be supported by the legs 120, 122 of the glider module 14, the foot rests 82 are removed from the chair module 12 prior to coupling the glider module 14 thereto. The legs of the glider module 14 are provided with foot rests 150 that are coupled to brackets 134. In one embodiment, the foot rests 150 include a generally U-shaped band 152 in which the two free ends of the band 152 are coupled, in one embodiment by a releasable bolt 154 received through slot 153, to bracket 134. Loosening bolts 154 allows the foot rest 150 to be rotated around bolts 154 or to be moved vertically along slot 153. Foot rest 150 has a foot plate 156 secured to the bottom of band 152 to provide a place for a user's feet. The band 152 may be provided with a raised edge 158 to further help secure the user's feet to the foot rest 150. Note that because of the nature of the operation of the glider module 14, it may be desirable to provide the foot rests with straps or the like (not shown) to ensure that the user's feet remain on the foot rests. Note that mechanisms or means that allow for the supination or pronation of the user's feet may be included on the foot plate 156 as described in conjunction with foot rest 82 of chair module 12.

Knee braces 160 are attached to the legs 120, 122 by means of a pair of bars 162. The knee braces 160 are generally U-shaped to address and support the knees of the user. In one embodiment, the knee braces 160 include a retention member 161 that is passed around behind the knee brace 160 to ensure that the knee of the user remains in the knee brace 160. The knee brace 160 is adjustable by means of slots 163 formed in the end of bars 162. Threaded fasteners 165 passed through knee braces 160 and slots 163 secure the knee braces to the bars. The knee braces 160 are also rotatable to a degree around the fasteners 165 that secure the knee braces 160 to the bars. The knee braces can be slid up to the top of the slots 163 and flipped over the top of the bars 162 to move them out of the way increasing the clearance between the bars 162 and the seat post 20, making entry to and egress from the apparatus easier.

In FIG. 5, the leftmost end of bar 162 has a slot 164 formed therein. This slot allows the bar 162 to slide with respect to the channel 124. Pin 166 is passed through slot 164 and is secured to channel 124. Pin 168 is passed through an aperture (obscured in FIG. 5 by pin 168) and secured to channel 126. Bar 162 rotates around pin 168 as the four-bar linkage reciprocates through its range of motion. As bar 162 rotates around pin 168, the changing distance between pins 166 and 168 is accommodated by slot 164. Furthermore, the action of the four-bar linkage acts to keep the knee braces 160 in general alignment with the foot rests 150 such that the legs of the user are supported during the use of the glider module 14.

The glider module 14 has a work surface 170 that is mounted on a telescoping support 172 that is coupled to the column 90. The work surface 170 has a chest pad 118 secured to rear edge thereof to support the chest of the user. Note that the work surface 170 is articulable in the same manner as is the work surface 110 of workstation module 16.

Figure 6C:
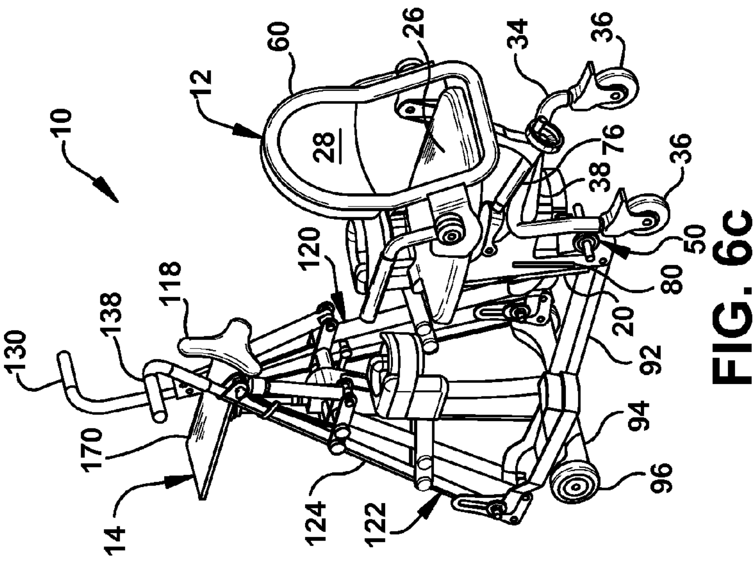
FIG. 6*c* is a side view of the modular standing frame of FIG. 5 in which the left hand leg of the glider is in its forward position and the right leg is in its rear position.
Figure 6B:
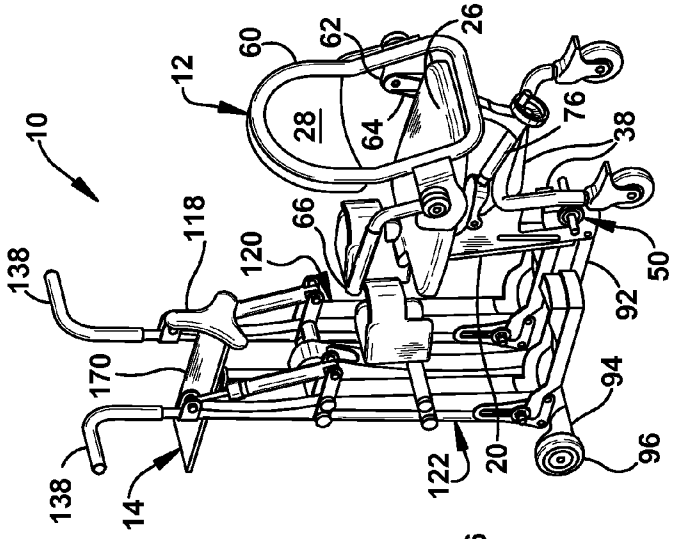
FIG. 6*b* is a side view of the modular standing frame of FIG. 5 in which the right and left hand legs of the glider are in a neutral position.
Figure 6A:
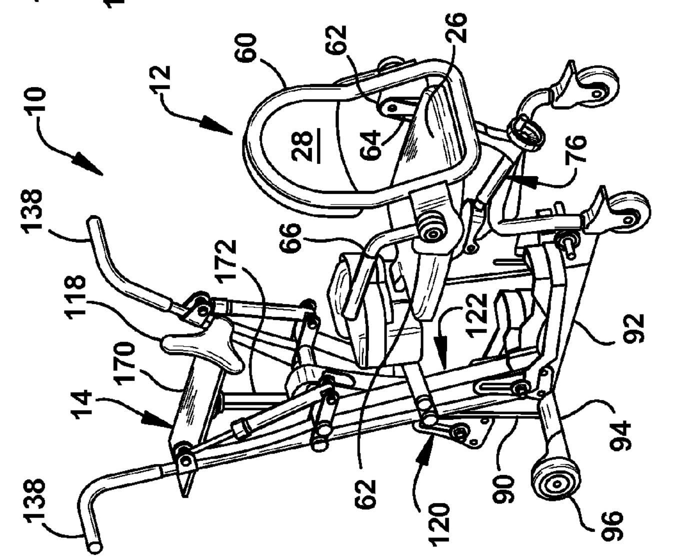
FIG. 6*a* is a side view of the modular standing frame of FIG. 5 in which the left hand leg of the glider is in its rear position and the right leg is in its forward position.

The respective legs 120 and 122 are coupled to one another by a coupling 176 that constrains the legs 120, 122 to reciprocate in opposition to one another as illustrated in FIGS. 6*a*, 6*b*, and 6*c*. In FIG. 6*a*, leg 122 is rotated into its rearmost position and leg 120 is rotated into its foremost position; in FIG. 6*b*, the legs 120, 122 are in their neutral positions; and in FIG. 6*c*, leg 122 is in its foremost position and leg 120 is in its rearmost position. Note that handles 138, being located above the pivot point of the legs 120 and 122 reciprocate in opposition to their respective legs. Taken together, the action of legs 120, 122 and their respective handles closely approximates a walking motion for a user of the standing frame 10. Where the user's legs are not able to induce the legs to reciprocate, the user may apply force to the handles 138 in order to start the reciprocating motion of the legs 120, 122. The resistive element 140 will provide resistance that will exercise the user's arms and/or legs. Preferably, the resistive elements 140 will be modifiable such that the level of resistance can be raised or lowered, depending on the needs of the situation. The resistive element 140 also has the benefit of providing enough dissipative force to the legs 120, 122 to damp out movement in the legs 120, 122 to a degree. This damping effect is useful in that it prevents or at least minimizes the chance that a user will experience sudden movements that can injure or dislodge the user from the standing frame 10. Furthermore, where the user is not able to induce any movement in the legs 120, 122, the resistive elements 138 may be adapted to drive the legs of the glider module 14.

Figure 9:
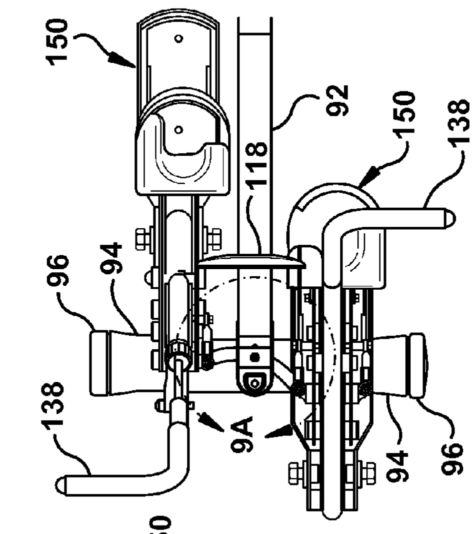
FIG. 9 is a top view of the modular standing frame of FIG. 6*c*.
Figure 8:
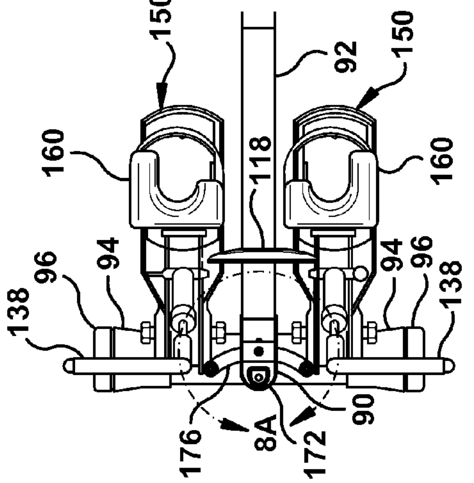
FIG. 8 is a top view of the modular standing frame of FIG. 6*b*.
Figure 7:
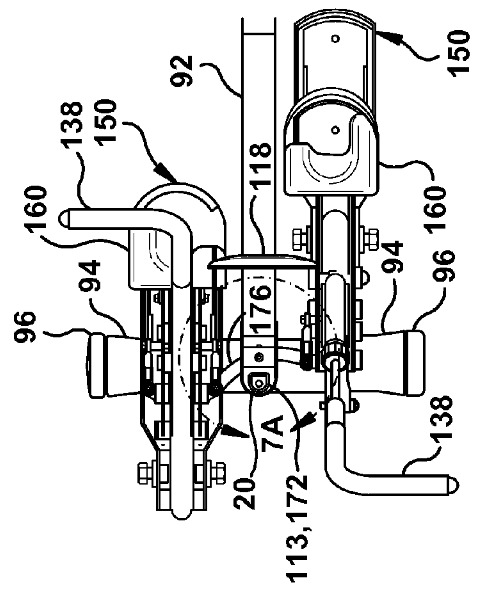
FIG. 7 is a top view of the modular standing frame of FIG. 6*a*.
Figure 9A:
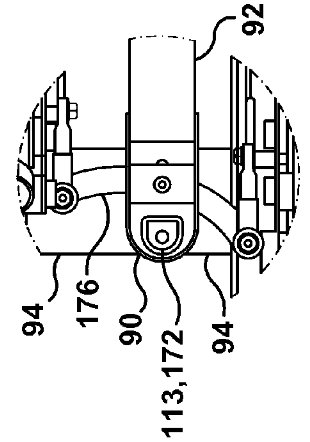
FIG. 9*a* is a close up detail view of the modular standing frame of FIG. 9 encircled by arrow 9A.
Figure 8A:
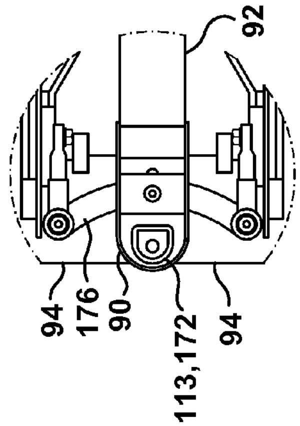
FIG. 8*a* is a close up detail view of the modular standing frame of FIG. 8 encircled by arrow 8A.
Figure 7A:
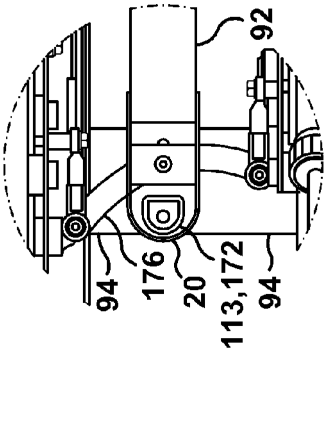
FIG. 7*a* is a close up detail view of the modular standing frame of FIG. 7 encircled by arrow 7A.

FIGS. 7, 8, and 9 are top views of the gliding module 14 that correspond to the positions of the gliding module in FIGS. 6*a*, 6*b*, 6*c*, respectively. In FIG. 7, leg 122 is rotated into its rearmost position and leg 120 is rotated into its foremost position; in FIG. 8, the legs 120, 122 are in their neutral positions; and in FIG. 9, leg 122 is in its foremost position and leg 120 is in its rearmost position. FIGS. 7*a*, 8*a*, and 9*a* correspond to FIGS. 7, 8, and 9 and illustrate the action of the coupling 176. Where leg 122 is rotated into its rearmost position and leg 120 is rotated into its foremost position, the left side of the coupling 176 is in its rearmost position and the right side is in its foremost position and vice versa.

Returning to FIG. 1, the mobility module 18 is also built upon a column 90 and coupling bar 92. In use, coupling bar 92 is coupled to the support member 20 of the chair module 12. Arms 180 extend laterally from the junction of the column 90 and coupling bar 92 and terminate in wheel supports 182. The portion of each wheel support 182 that extends forward of the arm 180 to which it is secured has attached thereto a small wheel 184 that acts to extend the wheel base of the standing frame 10, thereby increasing the stability of the standing frame 10. The portion of each wheel support 180 to the rear of the junction of the column 90 and the coupling bar 92 has secured thereto a large wheel 186.

A crosspiece 190 is attached to the top of column 90 of the mobility module 18. To the ends of the crosspiece 190 are rotatively secured hand wheels 192. The hand wheels 192 may be rotated independently of each other. Each of the hand wheels 192 is coupled to a respective wheel 186 by a chain or belt (not visible). The chain or belt connecting the hand wheels 192 and the wheels 186 are covered by a shroud 194. The column 90 of the mobility module 18 may also include a telescoping mechanism (not shown) for mounting a work surface thereon. As described above, the work surface will preferably be adapted to include an adjustable chest pad thereon. When the mobility module 18 is coupled to the chair module 12, a user seated therein may manually rotate the hand wheels 192 to move the entire standing frame 10 as if it were a wheel chair. Furthermore, with the addition of the aforementioned work surface and chest pad, a user may be able to use the mobility module 18 from a standing posture as well as a sitting posture. Where a user is not capable of manually rotating the hand wheels 192, the mobility module 18 may be provided with one or more motors (not shown) that are coupled to the wheels 186 to provide motive power thereto. Control of the wheels, and thereby of the motion of the standing frame 10, may be accomplished using a simple control such as a joystick (not shown).

Note that additional accessories may be used in conjunction with the modular standing frame 10. In one embodiment, exercise devices of various sorts (not shown) may be coupled to the work surface of the workstation module 16 to provide an opportunity to a user of the standing frame 10 to exercise.

CONCLUSION

Although specific embodiments of a standing frame have been illustrated and described herein, it is manifestly intended that this invention be limited only by the following claims and equivalents thereof.

What is claimed is:

1. A standing frame comprising:

a chair module that is movable between a seated condition for supporting a user in a seated position, and a standing condition for supporting a user in a standing position; the chair module comprising:

a seat and a seat back;

a linkage assembly connected to the seat back able to substantially maintain the seat back in a predetermined orientation as the chair module moves from the seated condition to the standing condition; and wherein the seat progresses from a substantially horizontal position to a substantially vertical position as the chair module moves from the seated condition to the standing condition;

at least one bracket connected to the seat back;

a work surface connected to the at least one bracket such that movement of the chair module from the seated condition to the standing condition causes movement of the work surface from a lowered condition to a raised condition; wherein the work surface remains in a fixed position relative to the seat back as the chair module moves from the seated position to the standing position; and wherein the work surface extends in front of the seat back across at least substantially an entire width of the seat back.

2. The standing frame of claim 1 wherein the chair module further comprises an adjustable slide connected to the work surface.

3. The standing frame of claim 1 wherein the chair module further comprises a chest pad connected to the work surface.

4. The standing frame of claim 1 wherein the at least one bracket comprises a hip bracket.

5. The standing frame of claim 1 wherein the work surface and chair module are connected so that movement of the chair module causes movement of the work surface.

6. A standing frame comprising:

a chair module that is movable between a seated condition for supporting a user in a seated position, and a standing condition for supporting a user in a standing position; the chair module comprising:

a seat and a seat back;

a linkage assembly connected to the seat back able to substantially maintain the seat back in a predetermined orientation as the chair module moves from the seated condition to the standing condition; and wherein the seat progresses from a substantially horizontal position to a substantially vertical position as the chair module moves from the seated condition to the standing condition;

a work surface connected to the seat back such that movement of the chair module from the seated condition to the standing condition causes movement of the work surface from a lowered condition to a raised condition; wherein the work surface remains in a fixed position relative to the seat back as the chair module moves from the seated position to the standing position; and wherein the work surface extends in front of the seat back across at least substantially an entire width of the seat back.

7. The standing frame of claim 6 wherein the chair module further comprises an adjustable slide connected to the work surface.

8. The standing frame of claim 6 wherein the chair module further comprises a chest pad connected to the work surface.

9. The standing frame of claim 6 wherein the work surface and chair module are connected so that movement of the chair module causes movement of the work surface.

* * * * *